United States Patent
Tofighbakhsh

(10) Patent No.: US 10,366,347 B2
(45) Date of Patent: Jul. 30, 2019

(54) METHODS, SYSTEMS AND DEVICES FOR MONITORING AND CONTROLLING MEDIA CONTENT USING MACHINE LEARNING

(71) Applicant: AT&T INTELLECTUAL PROPERTY I, L.P., Atlanta, GA (US)

(72) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/611,954

(22) Filed: Jun. 2, 2017

(65) Prior Publication Data
US 2018/0352301 A1    Dec. 6, 2018

(51) Int. Cl.
| | | |
|---|---|---|
| H04N 21/431 | (2011.01) | |
| G06N 20/00 | (2019.01) | |
| H04N 21/25 | (2011.01) | |
| H04N 21/258 | (2011.01) | |
| H04N 21/2668 | (2011.01) | |
| H04N 21/442 | (2011.01) | |
| H04N 21/454 | (2011.01) | |
| H04N 21/6543 | (2011.01) | |

(52) U.S. Cl.
CPC .......... *G06N 20/00* (2019.01); *H04N 21/252* (2013.01); *H04N 21/25883* (2013.01); *H04N 21/25891* (2013.01); *H04N 21/2668* (2013.01); *H04N 21/4316* (2013.01); *H04N 21/44222* (2013.01); *H04N 21/454* (2013.01); *H04N 21/6543* (2013.01)

(58) Field of Classification Search
CPC .................................................. H04N 21/4755
See application file for complete search history.

(56) References Cited

U.S. PATENT DOCUMENTS

| | | |
|---|---|---|
| 9,043,826 B1 | 5/2015 | Pickelsimer et al. |
| 9,292,404 B1 | 3/2016 | Boucher et al. |
| 9,300,675 B2 | 3/2016 | Vignisson et al. |
| 9,521,143 B2 | 12/2016 | Tembey et al. |
| 9,560,413 B2 | 1/2017 | Gonzalez |

(Continued)

OTHER PUBLICATIONS

Amato, Giuseppe et al., "Detection of Images With Adult Content for Parental Control on Mobile Devices?", Proceedings of the 6th International Conference on Mobile Technology, Application & Systems. ACM 2009, 2009, 1-5.

*Primary Examiner* — Michael H Hong
(74) *Attorney, Agent, or Firm* — Guntin & Gust, PLC; Antanu Das

(57) ABSTRACT

Aspects of the subject disclosure may include, for example, embodiments that comprise provisioning a target user profile and obtaining viewing history data. Further embodiments include generating a group of control rules according to the target user profile and training a machine learning application according to the viewing history data and the group of control rules. Additional embodiments include receiving a first indication that a first media content is to be presented to a target user. Also, embodiments include determining by the machine learning application, that the first media content does not conform to the group of control rules and providing a first notification that the first media content does not conform to the group of control rules. Other embodiments are disclosed.

20 Claims, 9 Drawing Sheets

(56) References Cited

U.S. PATENT DOCUMENTS

| | | | |
|---|---|---|---|
| 9,614,857 B2 | 4/2017 | Ben-Shalom et al. | |
| 9,628,477 B2 | 4/2017 | Smith et al. | |
| 2009/0328093 A1* | 12/2009 | Cansler | H04N 21/2668 |
| | | | 725/28 |
| 2013/0263001 A1 | 10/2013 | Doronichev et al. | |
| 2014/0181910 A1 | 6/2014 | Fingal et al. | |
| 2015/0070516 A1 | 3/2015 | Shoemake et al. | |
| 2015/0070585 A1 | 3/2015 | Sahrif-Ahmadi et al. | |
| 2016/0344873 A1 | 11/2016 | Jenzeh et al. | |
| 2016/0381411 A1 | 12/2016 | Drake et al. | |
| 2017/0085569 A1* | 3/2017 | Gupta | H04L 67/22 |
| 2017/0213472 A1* | 7/2017 | Huffman | G09B 7/08 |

* cited by examiner

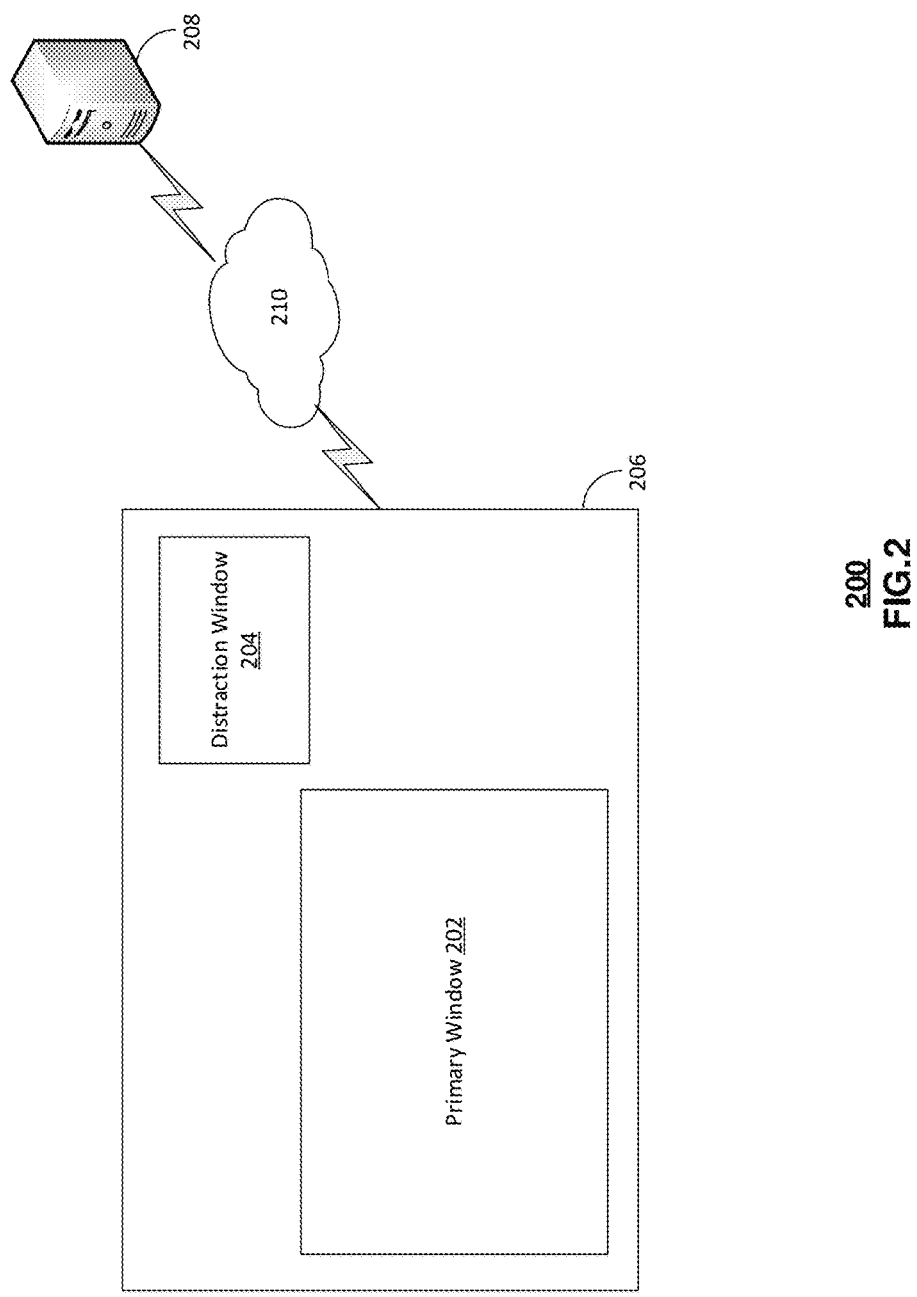

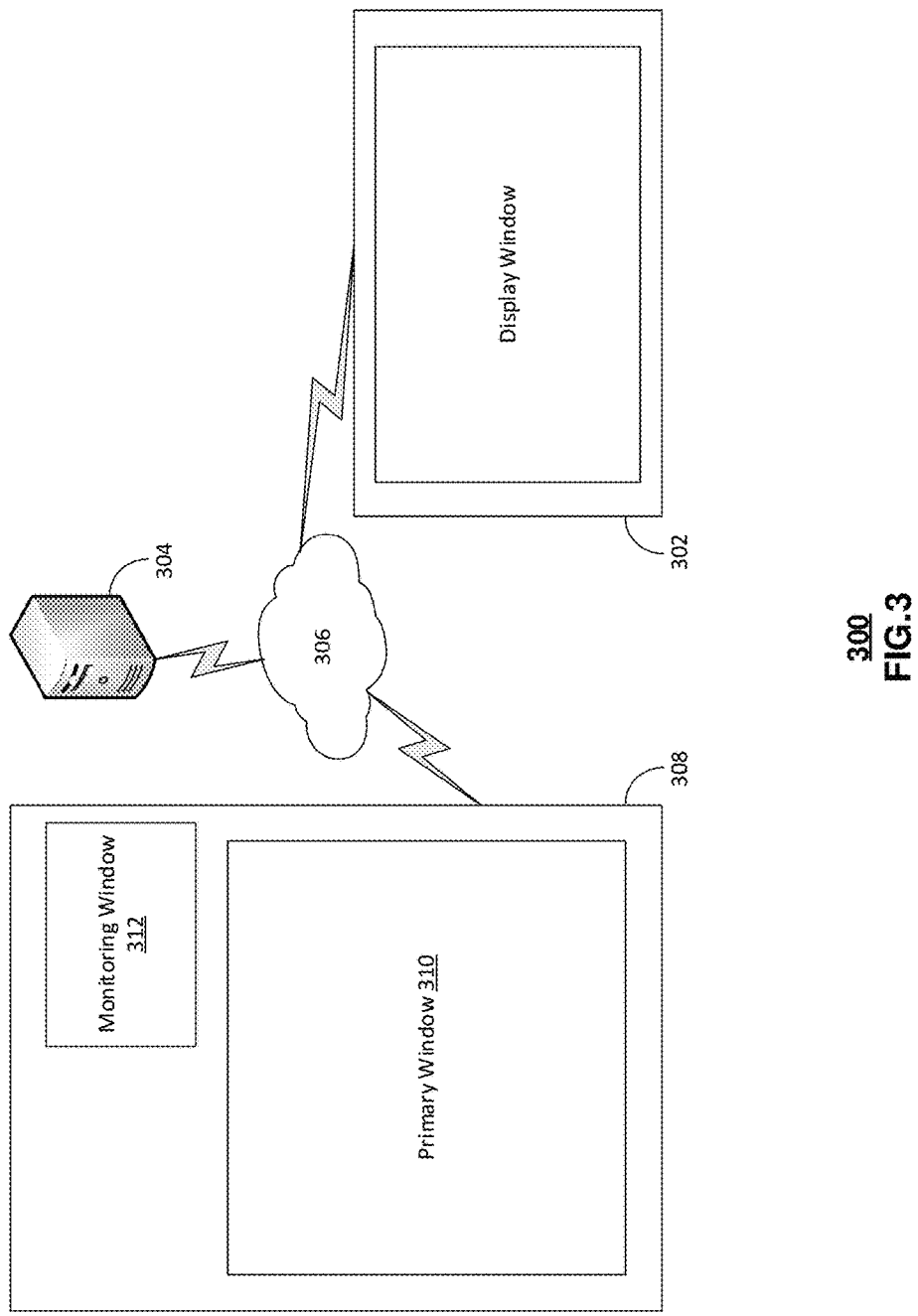

METHODS, SYSTEMS AND DEVICES FOR MONITORING AND CONTROLLING MEDIA CONTENT USING MACHINE LEARNING

FIELD OF THE DISCLOSURE

The subject disclosure relates to methods, systems, and devices for monitoring and controlling media content using machine learning.

BACKGROUND

Streaming and downloading media content to different devices within a household from a media content provider is a popular activity for both children and parents. Further, traveling household members including, both parents and children, can access media content from the media content provider at locations remote from the home. In addition, parents may equip media devices for children with parental controls to limit, filter, or otherwise control the viewing of media content by children.

BRIEF DESCRIPTION OF THE DRAWINGS

Reference will now be made to the accompanying drawings, which are not necessarily drawn to scale, and wherein:

FIGS. 1-3 depict illustrative embodiments of systems for monitoring and controlling media content using machine learning;

DETAILED DESCRIPTION

Figure 1:
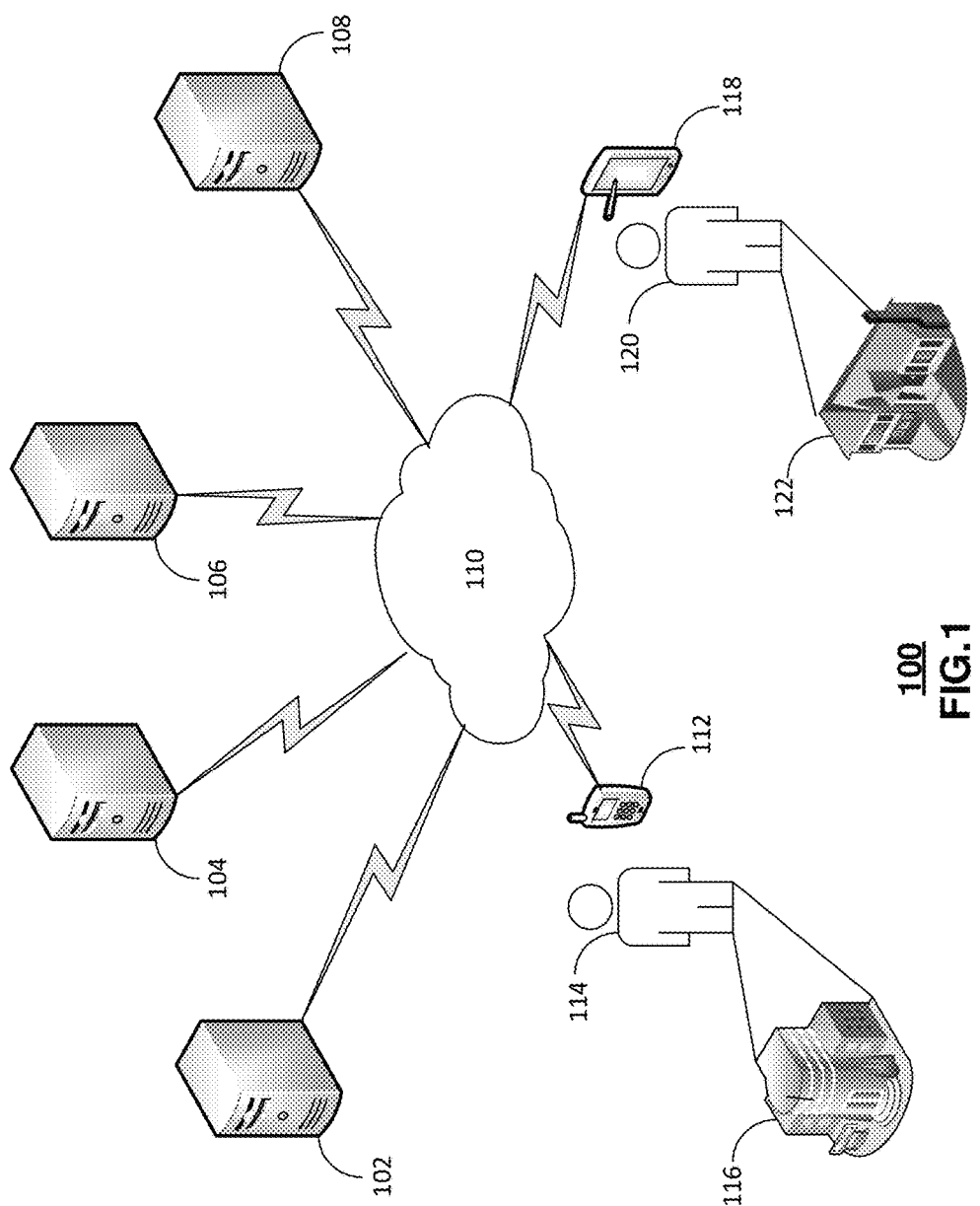

The subject disclosure describes, among other things, illustrative embodiments for monitoring and controlling media content using machine learning. Embodiments include provisioning a target user profile and obtaining viewing history data. Further embodiments include generating a group of control rules according to the target user profile and training a machine learning application according to the viewing history data and the group of control rules. Additional embodiments include receiving a first indication that a first media content is to be presented to a target user. Also, embodiments include determining by the machine learning application, that the first media content does not conform to the group of control rules and providing a first notification that the first media content does not conform to the group of control rules. Other embodiments are described in the subject disclosure.

One or more aspects of the subject disclosure include a device. The device comprises a processing system including a processor and a memory that stores executable instructions that, when executed by the processing system, facilitate performance of operations. The operations can include provisioning a target user profile and obtaining viewing history data. Further operations can include generating a group of control rules according to the target user profile and training a machine learning application according to the viewing history data and the group of control rules. Additional operations can include receiving a first indication that a first media content is to be presented to a target user. Also, operations can include determining by the machine learning application, that the first media content does not conform to the group of control rules. Further, operations can include providing a first notification that the first media content does not conform to the group of control rules.

One or more aspects of the subject disclosure include a machine-readable storage medium, comprising executable instructions that, when executed by a processing system including a processor, facilitate performance of operations. The operations can include generating a target user profile and receiving viewing history data. Further operations can include generating control rules according to the target user profile and training a machine learning application according to the viewing history data and the control rules. In addition, operations can include obtaining a first indication that media content is to be presented to a target user and determining by the machine learning application, that the media content does not conform to the control rules. Also, the operations can include transmitting a first notification that the media content does not conform to the control rules to a communication device associated with a monitoring user.

One or more aspects of the subject disclosure include a method. The method can include provisioning or updating, by a processing system including a processor, a target user profile and obtaining, by the processing system, viewing history data. Further, the method can include determining, by the processing system, a group of control rules according to the target user profile. In addition, the method can include training, by the processing system, a machine learning application according to the viewing history data and the group of control rules and receiving, by the processing system, a first indication that a first media content is to be presented to a target user. Also, the method can include determining, by the processing system, by the machine learning application, that the first media content does not conform to the group of control rules. Further, the method can include providing, by the processing system, a distraction media content. The distraction media content conforms to the group of control rules.

FIGS. 1-3 depict illustrative embodiments of systems for monitoring and controlling media content using machine learning. Referring to FIG. 1, system 100 includes a video control node 102, a media content server 104, a crowd source server 106, and a rating service server 108, all of which are computing devices. Further, system 100 includes a media device 118 that views media content provided by the media content server 104 to a child user 120 at a child's home 122. Also, the system 100 includes a monitoring media device 112 that receives video control alerts and/or media content provided to the child 120 to monitor by the parent user 114 located remote from the home 122 such as an office location 116.

In one or more embodiments, functions of the video control node 102 can be contained in one computing device or distributed among several computing devices. Further, some or all of the video control functions can be integrated into any of the media content server 104 and media devices 112, 118. Further, functions of the media content server 104 can be in one computing device or distributed over several computing devices. Functions of the video control function 102 can be integrated in any or all of such media content servers. In addition, each of the crowd source server 106 and rating service server 108 can be one or more computing devices.

In one or more embodiments, the parent user 114 and/or child user 120 can provide user input through a user device such as monitoring media device 112, media device 118, or some other user device (e.g. mobile phone, etc.). The user input can be provided by any input device or mechanism such as keyboard, mouse, touchscreen, gesture, image recognition, voice recognition, or a combination thereof. The media devices 112, 118 can be a mobile phone, tablet computer, laptop computer, portable media player, desktop computer, video game system, television, or any other media device. A parent user 114 may like filter, limit, or otherwise control the media content viewed by the child user 120 to prevent viewing of age-inappropriate media content (violence, sex, etc.) or media content that would be disturbing or upsetting to the child user (e.g. death of a parent, divorce, etc.). Further, the user input can be provided to the video control node 102 to provision a target user profile for the child user. In addition, the video control node 102 can obtain viewing history data for the child user. The viewing history data can be obtained from the media devices 112, 118 and/or media content server 104. In some embodiments, the child user 120 can generate a child user profile by inputting information for media content preferences as well as demographic information (age, gender, activities, etc.). In other embodiments, the parent user can input such information in conjunction or instead of the child user inputted information. In further embodiments, the child user profile can be generated based on the viewing history data.

In one or more embodiments, the video control node 102 can generate a group of control rules according to the target user profile, viewing history data, and/or further user input from the parent user 114 or child user 120. The parent user input or the child user input can be a list of exemplary media content that is appropriate for the child user 120. Further, the video control node 102 can train a machine learning application (e.g. software) according to the viewing history data and group of control rules as well as additional user input from the parent user 114 or child user 120. A trained machine learning application can be used to limit, filter or otherwise control the media content viewed by the child user 120 on the media device 118. The viewing history data can be used to train a machine learning application to allow a child user 120 to view media content that is same, similar or related to the media content in the viewing history data (e.g. similar or related media content described herein can be media content with the same actors, same production staff or company, media content with the same themes, same characters, same rating, similar crowd source response, etc.). Limiting, filtering and/or controlling media content can be physical or virtual as well as the location of machine learning application can be in the form of one or more physical devices and/or one or more virtual machines that can be placed at a network edge, or at or near user device.

In one or more embodiments, viewing history data can be used to train the machine learning application. In some embodiments, the video control node 102 identify the rating of the media content and then control media content viewed on the media device 118 based on the rating of the media content in the viewing history data. For example, media content can be given a TV rating developed by the television industry (e.g. TV-Y, TV-Y7, TV-Y7-FV, TV-G, TV-PG, TV-14, TV-MA, etc.) or a media content can be given a film rating developed by the Motion Picture Association of America (e.g. G, PG, PG-13, R, NC-17, etc.). The video control node 102 can obtain a rating of media content within the viewing history data from the viewing history data itself, from metadata of the media content, from a crowd source server 106, or from a rating service server 108. Further, the video control node 102 can request a rating for the media content in the viewing history data by providing a title or description of the media content to crowd source server 106 or the rating service server 108.

In one or more embodiments, the users of a crowd source website hosted by the crowd source server 106 can provide a quantitative (e.g. TV-PG, TV-MA, etc.) or a qualitative rating (e.g. review that states media content shows violence, death of a parent, etc.). The rating service server 108 can be operated by a rating service by the television or movie industry such as the Motion Picture Association of America. Further, the rating service server 108 can be identify the rating (qualitative—G, PG, PG-13, etc. or quantitative—e.g. critic review) according to the media content title or description and provide the rating to the video control node 102.

In one or more embodiments, after gathering the rating of the media content from the crowd source server 106 or rating service server 108, and identifying rating metrics for the media content in the viewing history data compared to certain thresholds (e.g. over 50% (threshold) of the media content in the viewing history data is rated TV-G), control rules are generated (e.g. any media content with a rating of TV-PG or above is determined not appropriate media content for the target user).

In one or embodiments, a parent user 114 or child user 120 can provide control rules to the video control node 102 through user generated input via the media monitoring media device 112, media device 118, or some other user device. For example, either the parent user 114 or child user 120 can provide a rule to not allow the media device 118 to present media content that shows a death of a parent as it would upset the child user 120. Thus, in some embodiments, the video control node 102 can analyze the description of any requested media content using textual analyzing/keyword searching techniques, analyze the audio content using audio processing techniques, or analyze the video content using image processing techniques to determine whether there is any scenes suggesting a death of a parent (or any other inappropriate content according to the control rules). In other embodiments, the video control node 102 can include obtaining media content and analyzing audio content of the media content using speech recognition resulting in audio content analysis. In further embodiments, the machine learning application of the video control node can determine the media content does not conform to the group of control rules according to the audio content analysis. That is, the audio analysis identifies offensive words that do not conform the control rules (e.g. offensive language, word "divorce", words "death" and "mother" in the same sentence, etc.). In other embodiments, the video control node can include obtaining media content and analyzing image content of the media content using image recognition resulting in image content analysis. Further, the machine learning application determines that the media content does not conform to the group of control rules according to the image content analysis. That is the image content analysis identifies offensive visual material (e.g. sex, violence, etc.).

In one or more embodiments, the video control node 102 may receive a qualitative rating/review from the crowd source server 106 or from rating service server 108. The qualitative rating or review can be in text, audio and/or video. The video control node 102 can use textual analyzing/keyword search techniques in a text qualitative rating or review according to control rules to determine whether the media content associated with the qualitative rating or review should be presented to the media device 118 for child user 120. Further, the video control node 102 can use audio recognition techniques to identify keywords according to control rules in the audio or video of the qualitative rating or review to determine whether the media content associated with the qualitative rating or review should be presented to the media device 118 for child user 120. For example, the keyword search or audio techniques can identity the phrase "death of the mother" and determine that the media content includes subject matter dealing with the death of a parent. In addition, video control node 102 can use image processing/recognition techniques to identify images according to control rules in the video of the qualitative rating or review to determine whether the media content associated with the qualitative rating or review should be presented to the media device 118 for child user 120. For example, the image processing/recognition techniques can analyze video to determine whether there is any review suggesting the media content includes inappropriate scenes for the child user (e.g. sex, violence, etc.).

A control rule may have been generated by the video control node 102 or provided by the parent user 114 or child user 120 to restrict presentation of media content that deals with a death of a parent as such subject matter would upset the child user 120.

In one or more embodiments, the video control node trains the machine learning application according to the rating information access from the rating service server 108.

In one or more embodiments, the child user 120 can be attempting to view media content with media device 118 at their residence 122 alone without parental supervision while the parent user 114 is working at their office 116. The system 100 can be configured such that in response to requesting media content from media content server 104, the media device 118 or media content server 104 can provide an indication, message, or otherwise notify to the video control node 102 that the child user via the media device 118 has requested media content. In further embodiments, the media device 118 may have a media content viewing application that can be used when the child user logs into the media device or the media content viewing application can be used with the child user's login credentials. After logging in, the media device 118 or the media content viewing application can be associated with the child user profile as well as the control rules for the child user profile and is in communication with video control node 102 when the media content is requested. Thus, the indication to the video control node 102 that media content is requested by the child user includes or directs the video control node 102 to the child user profile such that the video control node 102 can access the control rules associated with the child user profile. After receiving the indication of the media content request and accessing the control rules associated with the child user profile, the video control node 102 processes the media content using the machine learning application, as described herein, to determine that that the media content does not conform to the control rules associated with the child user profile (e.g. determining rating, using text, audio, image processing, etc.). In addition, the video control node 102 can send a notification to the media device 112 and/or media device 118 that the media content does not conform to the control rules. The notification can include the title or description of the requested media content and whether or not the media content conforms to parental control rules (in other embodiments, the video control node 102 can be configured to provide a notification to the parent user 114 via the media device 112 in every instance media content is requested/will be provided to the child user whether or not the requested or provided media content conforms to the control rules). In some embodiments, the parent user 114 can provide send instructions to the video control node 102 via media device 112 to prevent presenting the media content to the child user 120 on media device 118. In other embodiments, the video control node 102 can be configured a prior to prevent presenting the media content to the child user 120 on media device 118 without further instructions from parent user 114. In additional embodiments, the parent user 114 may provide instructions to the video control node to allow presenting the media content to media device 118 even though the requested media content does not conform to the control rules.

In one or more embodiments, the child user 120 may be at a residence that is not their home (e.g. a friend's house) but has access to their media content provider not only from media device 118 but from other media device in the residence (e.g. television, computer, etc.). The media content provider can be provided with the presence information by the media device 118 that can be relayed to the video control node 102. Further, the video control node 102 can be provided with presence information of media device 112. Further, video control node 102 is provided with information that the media device 112 is associated with a parent user 114 and that media device 118 is associated with the child user 120. Presence information is information that provides the location of the media device 112 or media device 118. By comparing the presence information of media device 112 and the presence information of media device 118, the video control node 102 determines that it is likely that parent user 114 is not in the same location as child user 120, thereby not likely under parent supervision. In other embodiments, the video control node 102 does not apply control rules using the machine learning application unless the video control node determines that the media device 112 is not in the same location (within a threshold distance) as media device 118.

In one or more embodiments, a media content request may be sent to the media content server 104 operated by the media content service provider by a media device associated with the residence (e.g. a friend's house of child user 120). In some embodiments, the media content server 104 and video control node 102 can be co-located or integrated into the same computing device or distributed across several computing devices. The video control node 102 and/or the media content server 104 determines that media content is being requested by a media device associated at a residence that is at a same location as media device 118. Thus, the video control node 102 is provided an indication of the media content request to present the media content to the child user 120. Further, the video control node 102 determines using the machine learning application that the media content does not conform to the control rules. In some embodiments, a notification is sent to the media device 112 for the parent user 114 that the media content not conforming to the control rules may be presented to the child user 120. Further, the parent user 114 can send instructions to the video control node 102 via media device 112 to prevent presenting the media content to the child user 120 on the media device associated with the residence (e.g. a friend's house). In other embodiments, the video control node 102 can be configured a prior to prevent presenting the media content to the child user 120 on any media device located within a threshold distance of media device 118 without further instructions from parent user 114 even at residence not associated with the child user 120 such as a friend's house. In additional embodiments, the parent user 114 may provide instructions to the video control node to allow presenting the media content to the media device associated with the residence as an exception to the control rules.

In one or more embodiments, the parent user 114 can be provided a notification on media device 112 by the video control node 102 that media content has been requested to be presented to the child user 120. Instead of providing instructions to either prevent or allow presenting the media content to the child user 120, the parent user 114 via the media device 112 can provide instructions to the video control node 102 to present the media content to the media device 112 of the parent user 114 by the video control node 102 so as to monitor the media content. The parent user 114 may want to monitor the media content because the parent user 114 is not familiar with the requested media content and would like to view the media content to determine whether the media content is appropriate for the child user 120. The media content can be presented on media device 112 prior to, time-delayed or simultaneously with presenting the media content to the child user 120. Such embodiments allow the parent user 114 to monitor the media content and decide at any point to provide further instructions to the video control node 102 via the media device 112 to stop presenting the media content to the child user 120. For example, the parent user 114 can monitor the media content on the media device 112 as the media content is presented to the child user. A portion of the media content can suddenly show a potentially disturbing scene for child user 120. If the media content is shown on a time-delay between the parent user 114 and child user 120, the parent user can send further instructions to the video control node 102 to stop presenting the media content to the child user 120 or instruct the video control node to fast forward the disturbing scene (the parent user can provide instructions to the video control node 102 to not present a portion of the media content containing the disturbing scene by providing a time interval that includes starting time point and an ending time point of the media content). The video control node 102 can instruct the media content server 104 or media device 118 to either stop presenting the media content or not present a portion of the media content according to a time interval of the media content according to the parent user 114 instructions.

In one or more embodiments, in determining that media content is to be presented to the child user 120 that does not conform to the control rules, the video control node 102 can instruct the media content server 104 to provide distraction media content. Further, distraction media content is media content that conforms to the control rules. In addition, distraction media content can be media content that was selected from the viewing history data associated with the media device 118 of child user 120. Distraction media content can be provided automatically in response to determining the request media content does not conform to control rules. In other embodiments, the parent user 114 is notified of the request for media content and provides further instructions to the video control node to provide or cause to provide distraction media content to the child user.

In one or more embodiments, the video control node 102 can detect the type of media content requested. For example, the video control node can detect whether the requested media content is passive media content (e.g. viewing of a television show, movie, video, etc.) or interactive media content (e.g. web browsing, video game, etc.). Based on an a priori configured threshold time by the parent user 114, the child user 120 may be allotted only a certain amount of time for viewing each type of media content (i.e. passive media content or interactive media content). In response to determining that the viewing of a particular type of content has exceeded a threshold time period, the video control node 102 can provide distraction media content to the child user 120 for the child user 120 to engage in viewing a different type of media content. In other embodiments, the parent user 114 can configure the video control node 102 to provide distraction media content to the child user 120 whenever the child user 120 views a particular type of content. For example, when the requested media content is a violent video game, distraction media content such as an educational video game is provided to the child user 120.

In one or more embodiments, in addition to the parent user 114 or child user 120 providing input to the video control node 102 and the video control node 102 generating the control rules for viewing media content for the child user, the crowd source server 106 can provide crowd source input to the video control node 102. Thus, the video control node 102 does not only generate control rules for the child user viewing media content according to the parent user input and the child user input but also according to the crowd source input. For example, the crowd source input based on content on the crowd source server 106 may suggest that a particular media content contains scenes depicting or describing death of a parent. The video control node 102 may generate a control rule to prevent presenting the particular media content to the child user 120 because description of parent death upsets the child user 120.

In one or more embodiments, the video control node 102 can process the type of media content viewed or preferred by the child user 120 based on the viewing history data or the child user profile using predictive analytics. In further embodiments, the video control node 102 can use predictive analytics to determine the type of media content not preferred by the child user 120 or the parent user 114 and predict similar media content that the child user 120 and/or parent user 114 would prefer.

In one or more embodiments, the video control node 102 determines that the requested media content does not conform to the control rules and send s notification of which to the parent user 114 via the monitoring media device 112. Further, the parent user 114 via the monitoring media device 112 can provide instructions or some other indication to allow the presenting of the requested media content. The video control node 102 retrains the machine learning application that the requested media content conforms to the control rules such that in the future if the same or similar media content is requested by the child user 120, then the control rules would allow the presentation of such media content.

In one or more embodiments, the video control node 102 determines the requested media content conforms to the control rules and determines that the requested media content is allowed to be presented to the child user 120 according to the control rules. In further embodiments, the video control node 102 sends a notification to the parent user via the monitoring media device 112 that the requested media content conforms to the control rules and is to be presented to the child user 120. However, the parent user 114 recognizes the requested media content and determines that the requested media content is inappropriate for the child user 120 to view. Thus, the parent user 114 sends instructions or otherwise sends a notification to the video control node 102 not to present the requested media content to the child user 120. The video control node 102 then identifies that the requested media content does not conform to the control rules. In other embodiments, the video control node 102 retrains the machine learning application that the requested media content does not conform to the control rules so that in the future the same or similar media content is not presented to the child user 120.

In one or more embodiments, the video control node 102 can detect that the child user 120 is interacting with a stranger in a chat room, online forum, electronic game, or any other online environment via media device 118. That is, the video control node 102 can be provisioned with user handles and user names of friends and family that the child user 120 is allowed to interact in an online environment and generates control rules accordingly. If the video control node 102 detects that the child user 120 is interacting with an unknown user in an online environment, the video control node 102 can notify the parent user (i.e. monitoring user) via the media device 112 and/or prevent further online interaction via media device 118 (or any other media device) between the child user 120 and the unknown user.

Referring to FIG. 2, in one or more embodiments, a computer server 208 operating as a media content server and a video control node receives a request for media content from a media device 206 of a child user. The media content is determined by the machine learning application of the video control node not to conform to control rules. However, the media content is provided to the media device 206 from the computer server 208 over communication network 210 and can be presented in the primary window 202 of the display for media device 206. Further, the video control node can identify one or more distraction media content to provide to the media device 206. Distraction media content can be media content that conforms to the control rules. In some embodiments, links, trailers, advertisements, and/or titles of the one or more distraction media content can be provided to the media device 206 and displayed in a distraction window 204 of the display. In other embodiments, the distraction window 204 can present a list of titles with links to the one or more distraction media content. Further, the distraction window can present a list of trailers or advertisement of the one or more distraction media content. A child user can select (e.g. click, etc.) a link, trailer, or advertisement to one of the distraction media content to present the on the primary window 202.

Referring to FIG. 3, in one or more embodiments, a request for media content is received by a computer server 304 that can be media content server integrated with a video control node. The media content request is provided by a child user's media device 302 over a communication network 306. The video control node can determine that the requested media content does not conform to control rules using a machine learning application. The computer server 304 can provide a notification to a media device 308 for a parent user over the communication network 306 using the video control node function (which includes the machine learning application). The parent user may not be familiar with the media content and determines to monitor the requested media content as the requested media content is presented to the child user. The parent user via the media device 308 provides instructions to the computer server 304 over the communication network 306 to present the requested media content to the media device 302 for the user but also to provide the requested media content to be presented to the media device 308 for the parent user so that the parent user can monitor the requested media content accordingly. The requested media content can be presented on the display window of the media device 302 for the child user. Further, the requested media content can be presented to the monitoring window 312 of the media device 308 for the parent user. This allows the parent user to conduct other tasks in the primary window of the media device 308. In some embodiments, the requested media content is presented on media device 302 with a time delay with respect to its presentation on media device 308. This allows for the parent user to view a scene of the media content prior to the scene to be presented to the child user. Thus, if the scene contains any objectionable or upsetting material, the parent user can send instructions to the computer server 304 to stop presentation of the requested media content on media device 302. In further embodiments, the requested media content is streamed from computer server 304 to media device 302. The computer server 304, in response to instructions of the parent user, can prevent presentation of the requested media content by discontinuing the streaming of the requested media content. In additional embodiments, the requested media content can be downloaded to the media device 302. The computer server 304, in response to instructions of the parent user, can prevent presentation of the requested media content by sending a notification or message to the media device 302 to discontinue the presentation of the requested media content and the media device 302 discontinues the presentation accordingly.

Figure 4A:
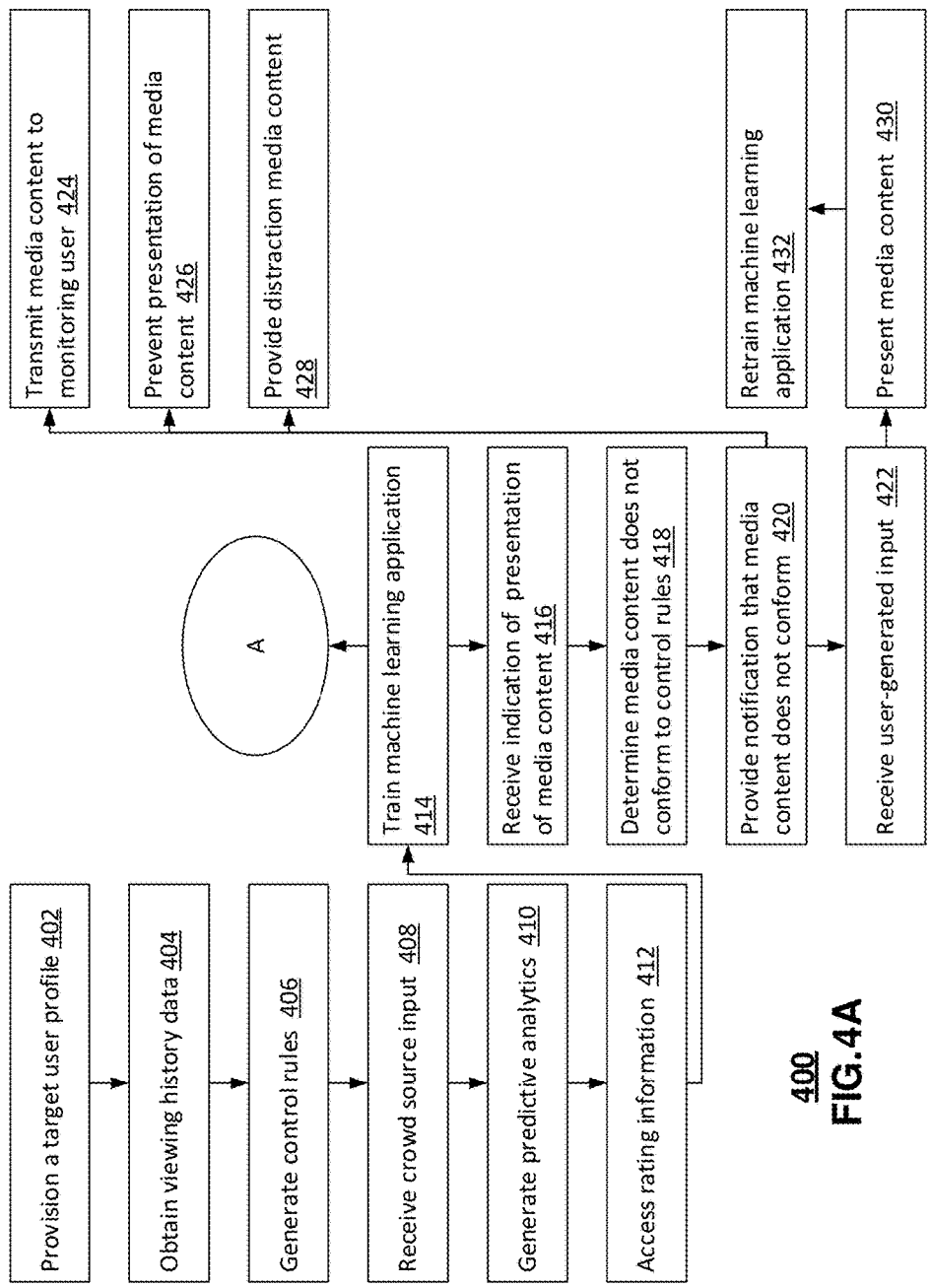
FIGS. 4A and 4B depict illustrative embodiments of methods used in portions of the systems described in FIGS. 1-3.
Figure 4B:
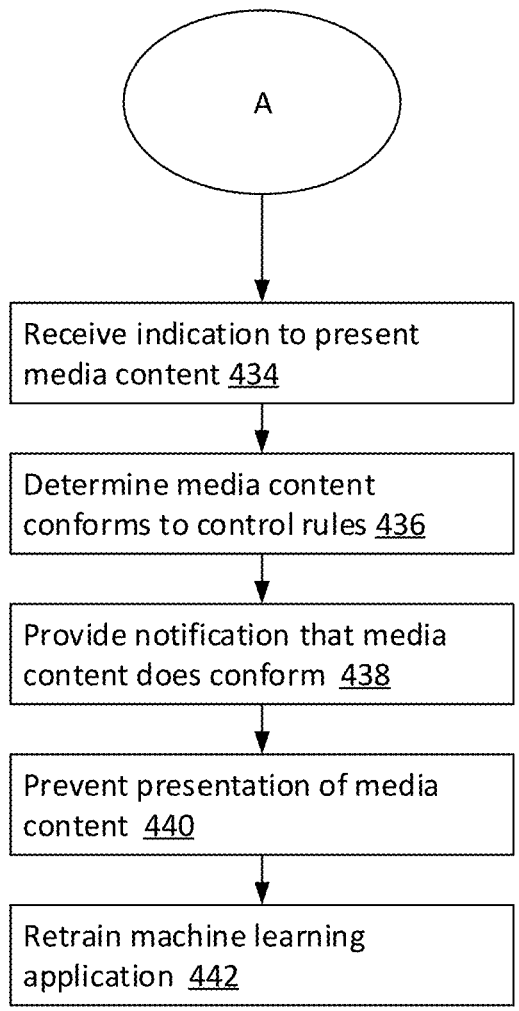

FIGS. 4A and 4B depict illustrative embodiments of methods used in portions of the systems described in FIGS. 1-3. Referring to FIG. 4A, in one or more embodiments, a method 400 can be implemented by a video control node comprising a machine learning application as described herein that is implemented by a computing device or integrated into a media content server (or a group of media content servers or a cloud media server system). The method 400 can include, at 402, the video control node provisioning a target user profile. The target user profile can be a profile for a child user. A parent user and/or the child user can provide information to provision the target user profile. Further, the method 400 can include, at 404, the video control node obtaining viewing history data. In some embodiments, the viewing history data can be obtained from a media content server that links media content provided to the target user with the target user profile. In other embodiments, the viewing history data can be obtained from one or more media devices associated with the target user. In some embodiments the target user profile is generated from the viewing history data. In addition, the method 400 can include, at 406, the video control node generating a group of control rules according to the target user profile. Also, the method 400 can include, at 408, the video control node receiving crowd source input. In some embodiments, the video control node can generate the group of control rules according to the crowd source input. Further, the method 400 can include, at 410, the video control node generating predictive analytics according to the viewing history data and the target user profile. In addition, the method 400 can include, at 412, the video control node accessing rating information. In some embodiments, accessing rating information can be from a media content server, crowd source server, and rating service server.

In one or more embodiments, the method 400 can include, at 414, the video control node training a machine learning application according to the viewing history data and the group of control rules. In some embodiments, the training of the machine learning application can also be according to crowd source input, predictive analytics, and rating information. Further, the method 400 can include, at 416, the video control node receiving a first indication that a first media content is to be presented to a target user. In some embodiments, the indication can be a notification, alert, message or signal. In other embodiments, the indication can be obtained from the media content server while in further embodiments the indication can be obtained from one or more media device associated with the child user. In addition, the method 400 can include, at 418, the video control node determining by the machine learning application, that the first media content does not conform to the group of control rules. Also, the method 400 can include, at 420, that the video control node can include providing a first notification that the first media content does not conform to the group of control rules. The first notification can be a message, alert, or signal. In some embodiments, the first notification can be sent to a media device associated to the child user and presented to the child user. In other embodiments, the video control node can provide the first notification to a communication device associated with a monitoring user. The communication device can be a media device and the monitoring user can be the parent user.

In one or more embodiment, the method 400 can include, at 424, the video control node transmitting the first media content to a communication device associated with a monitoring user. In some embodiments the monitoring user can be a parent user and in other embodiments the communication device can be a media device associated with the parent user. Also, the first media content can be presented to the monitoring user on the communication device. Further, the method 400 can include, at 426, the video control node preventing presentation of the first media content. In some embodiments, the prevention of presenting the first media content can be from a media device associated with the target user. In some embodiments, a media device associated with the target user can be a media device registered with target user. In other embodiments, a media device is associated with a target user if the target user's media device is within a threshold distance or in the viewing area of another media device. In further embodiments, preventing presentation of the first media content can be in response to receiving user-generated input from a communication device associated with a monitoring user. In some embodiments, the user-generated input can be from a media device (i.e. communication device) associated with a parent user (i.e. monitoring user). In such embodiments, the video control node may not be configured to automatically prevent presentation of media content identified as not conforming to the control rules. In addition, the method 400 can include, at 428, the video control node providing a distraction media content. In some embodiments, the distraction media content can be presented simultaneously with the first media content or as an alternative to the first media content (when the first media content was prevented from being presented). In other embodiments, the distraction media content is provided in response to determining the first media content to be presented to the target user is passive media content. In some embodiments, the parent user configures the video control to limit the amount of time a child user can view passive content, such as web pages, television shows, movies, or other video. As an alternative, the video control node can provide distraction media content that is more interactive, like a video game or an educational game.

In one or more embodiments, the method 400 can include, at 422 the video control node receiving user-generated input. Further, the method 400 can include, at 430, the video control node presenting media content on a media device associated with the target user. In some embodiments, the video control node can be configured a priori to prevent presenting of any media content that does not conform to the control rules. However, in response, the monitoring user can provide user-generated input that contains instructions to present the first media content to the target user (usually on a media device associated with the target user). In addition, the method 400 can include, at 432, retraining the machine learning application of the video control node. The machine learning application can be retrained so that the video control node in the future can present the same or similar media content based user-generated input from the monitoring user allowing presentation of the media content.

Referring to FIG. 4B, in one or more embodiments, a method 450 can be implemented by a video control node comprising a machine learning application as described herein that is implemented by a computing device or integrated into a media content server (or a group of media content servers or a cloud media server system). Also, the method 450 is dependent on state A found in both FIGS. 4A-4B. The method 450 can include, at 434, the video control node receive an indication that second media content is to be presented to the target user (i.e. on a media device associated with the target user). Further, the method 400 can include, at 436, the video control node determining by the machine learning application, that the second media content does conform to the group of control rules. In addition, the method 400 can include, at 438, the video control node providing another notification that the second media content does conform to the group of control rules. This notification, as other with indications or notification, described herein, can be a message, alert, or signal. Also, the notification can be sent to a monitoring user. The video control node can receive user-generated input from the monitoring user to prevent presenting the second media content. Thus, the method 400 can include, at 440, the video control node preventing presentation of the second media content on a media device associated with the target user. This can include sending instructions to either a media content server or the media device associated with the target user to prevent presentation of the second media content. In addition, the video control node can receive an indication that the second media content was not presented on the media device associated with the target user. Also, the method 400 can include, at 442, the video control node retraining the machine learning application according to the second media content not conforming to the group of control rules. Thus, in the future, the video control will be able to determine that the same or similar media content does not confirm to the control rules and can prevent presentation of the media content, accordingly.

While for purposes of simplicity of explanation, the respective processes are shown and described as a series of blocks in FIGS. 4A-4B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In addition, entire or partial embodiments described in FIGS. 4A-4B as well as other figures can be combined and separated accordingly.

Figure 5:
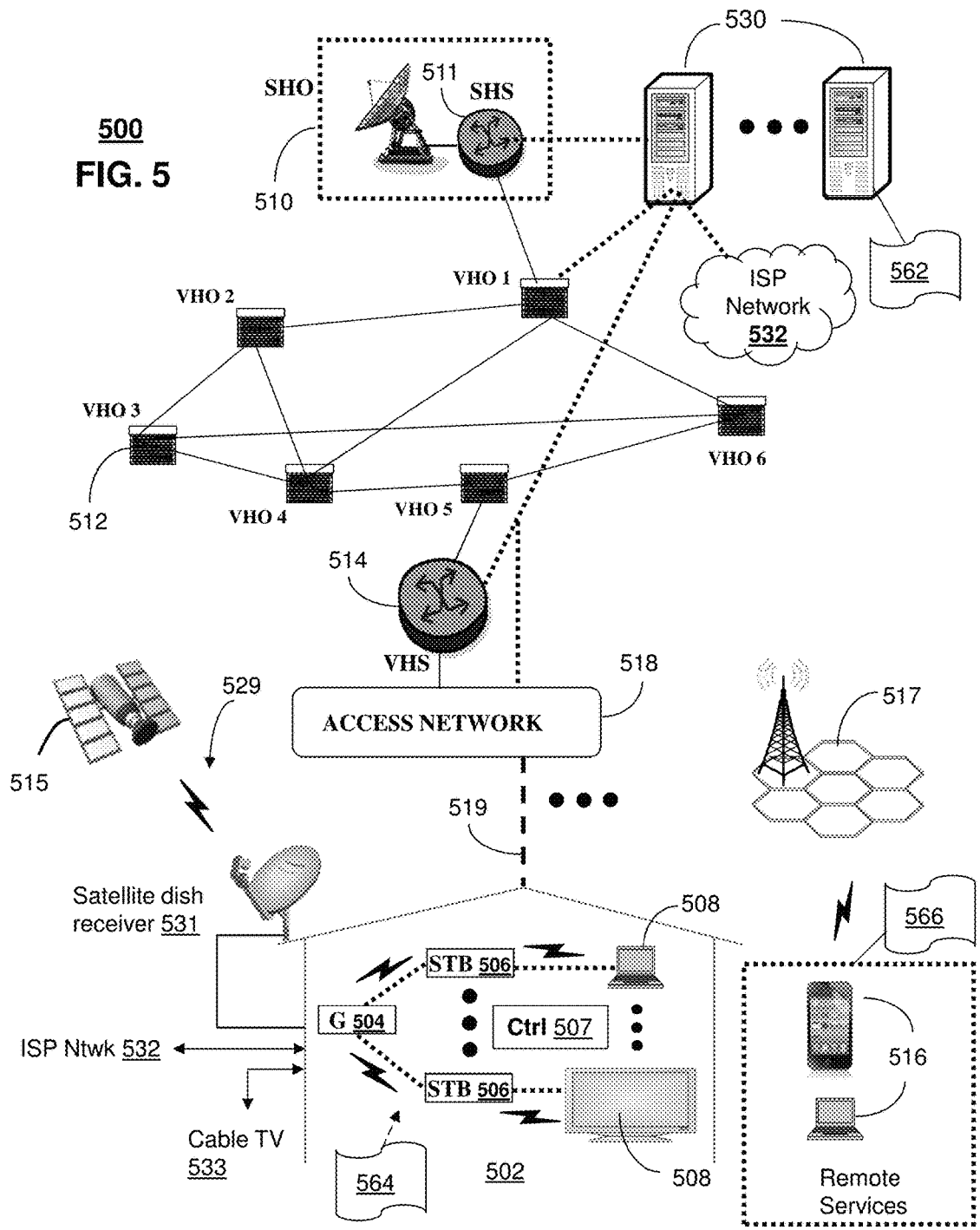
FIGS. 5-6 depict illustrative embodiments of communication systems that provide media services such as controlling media content using machine learning.

FIG. 5 depicts an illustrative embodiment of a communication system 500 for providing various communication services, such as delivering media content. The communication system 500 can represent an interactive media network, such as an interactive television system (e.g., an Internet Protocol Television (IPTV) media system). Communication system 500 can be overlaid or operably coupled with refer to systems 100, 200, 300 of FIGS. 1-3 as another representative embodiment of communication system 500. For instance, one or more devices illustrated in the communication system 500 of FIG. 5 can be have the function of a video control node, embodiments of which can include provisioning a target user profile and obtaining viewing history data. Further embodiments can include generating a group of control rules according to the target user profile. Additional embodiments can include training a machine learning application according to the viewing history data and the group of control rules. Also, embodiments can include receiving a first indication that a first media content is to be presented to a target user. Further embodiments can include determining by the machine learning application, that the first media content does not conform to the group of control rules. Additional embodiments can include providing a first notification that the first media content does not conform to the group of control rules.

In one or more embodiments, the communication system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol. The VHS 514 can distribute multimedia broadcast content via an access network 518 to commercial and/or residential buildings 502 housing a gateway 504 (such as a residential or commercial gateway).

The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a video control node or media content server integrated with video control node functions (herein referred to as video control node 530). The video control node 530 can use computing and communication technology to perform function 562, which can include among other things, the techniques described by methods 400, 450 of FIGS. 4A-4B. For instance, function 562 of video control node 530 can be similar to the functions described for video control node 102 of FIG. 1 in accordance with methods 400, 450. The media processors 506 and wireless communication devices 516 can be provisioned with software functions 564 and 566, respectively, to utilize the services of video control node 530. For instance, functions 564 and 566 of media processors 506 and wireless communication devices 516 can be similar to the functions described for the communication devices 112, 118 of FIG. 1 in accordance with methods 400, 450.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
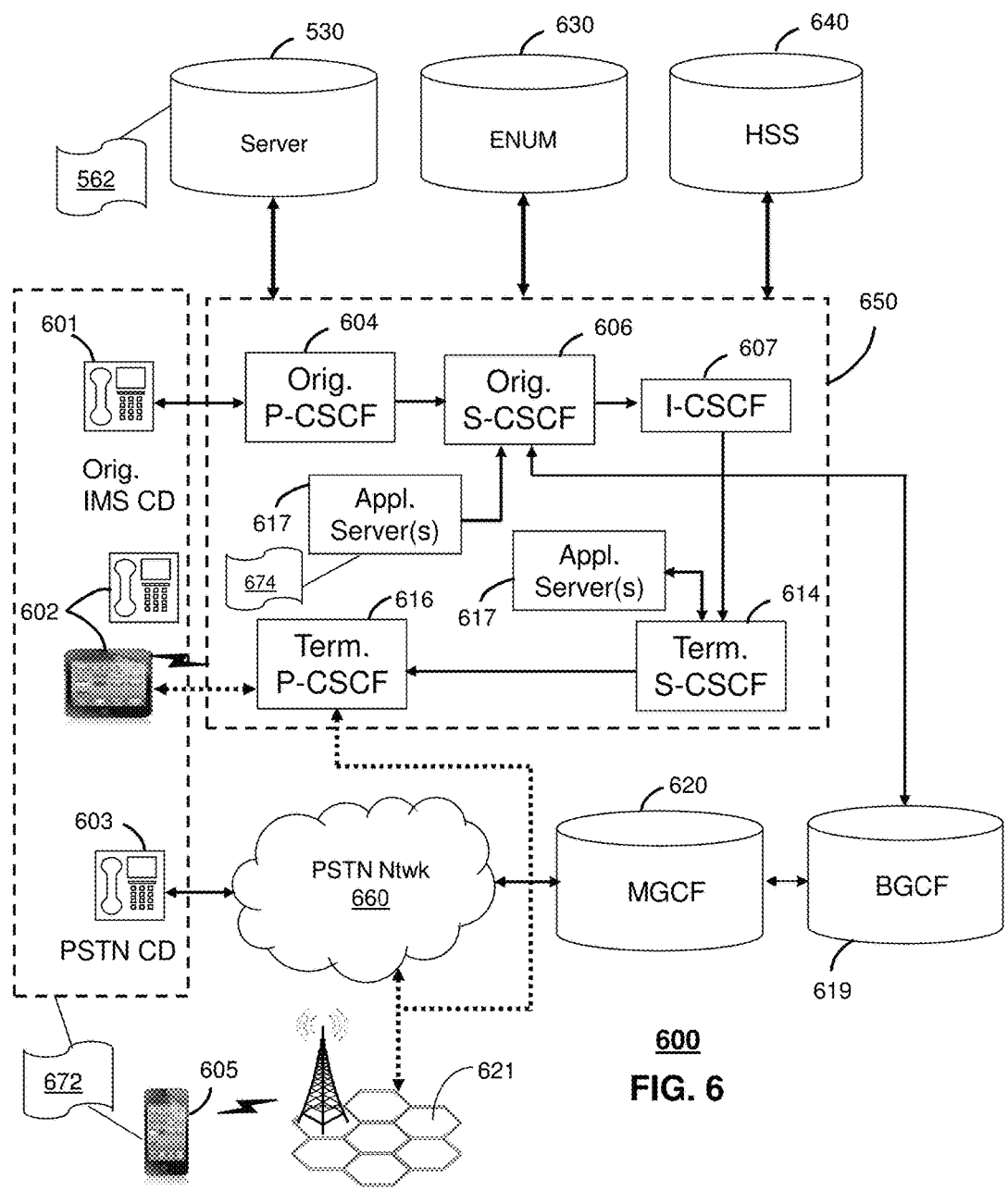

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with system 100, 200, 300 of FIGS. 1-3 and communication system 600 as another representative embodiment of communication system 600. Embodiments can include provisioning a target user profile and obtaining viewing history data. Further embodiments can include generating a group of control rules according to the target user profile. Additional embodiments can include training a machine learning application according to the viewing history data and the group of control rules. Also, embodiments can include receiving a first indication that media content is to be presented to a target user. Further embodiments can include determining by the machine learning application, that the media content does not conform to the group of control rules. Additional embodiments can include providing a first notification that the media content does not conform to the group of control rules to a communication device associated with a monitoring user.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 600 of FIG. 6.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The video control node 530 of FIG. 5 can be operably coupled to communication system 600 for purposes similar to those described above. Video control node 530 can perform function 562 and thereby provide video control services to the CDs 601, 602, 603 and 605 of FIG. 6 similar to the functions described for video control node 102 of FIG. 1 in accordance with methods 400, 450 of FIGS. 4A-4B. CDs 601, 602, 603 and 605, which can be adapted with software to perform function 672 to utilize the services of the video control node 530 similar to the functions described for communication devices 112, 118 of FIG. 1 in accordance with methods 400, 450 of FIGS. 4A-4B. Video control node 530 can be an integral part of the application server(s) 617 performing function 674, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
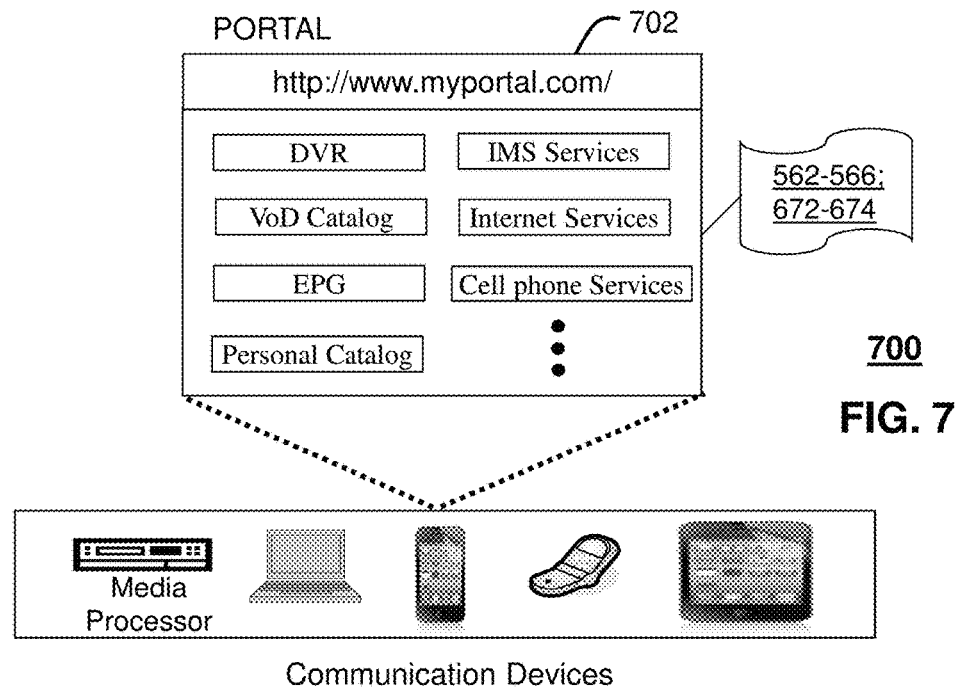
FIG. 7 depicts an illustrative embodiment of a web portal for interacting with the communication systems for controlling media content using machine learning.

FIG. 7 depicts an illustrative embodiment of a web portal 702 of a communication system 700. Communication system 700 can be overlaid or operably coupled with systems 100, 200, 300 of FIGS. 1-3, communication system 500, and/or communication system 600 as another representative embodiment of systems 100, 200, 300 of FIGS. 1-3, communication system 500, and/or communication system 600. The web portal 702 can be used for managing services of systems 100, 200, 300 of FIGS. 1-3 and communication systems 500-600. A web page of the web portal 702 can be accessed by a Uniform Resource Locator (URL) with an Internet browser using an Internet-capable communication device such as those described in FIGS. 1-3 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-566, and 672-674 to adapt these applications as may be desired by subscribers and/or service providers of systems 100, 200, 300 of FIGS. 1-2, and communication systems 500-600. For instance, users of the services provided by video control node 102 or video control node 530 can log into their on-line accounts and provision the video control node or video control node 530 or media device 112, 118 with control rules or a list of media content that are permissible or impermissible for a child user 120 to view. In addition, the web portal 702 can be used to configure threshold times to view particular types of content for the child user (passive media content, active media content, television shows, films, video games, educational games, etc.) Service providers can log onto an administrator account to provision, monitor and/or maintain the systems 100, 200, 300 of FIGS. 1-3 or video control node 530.

Figure 8:
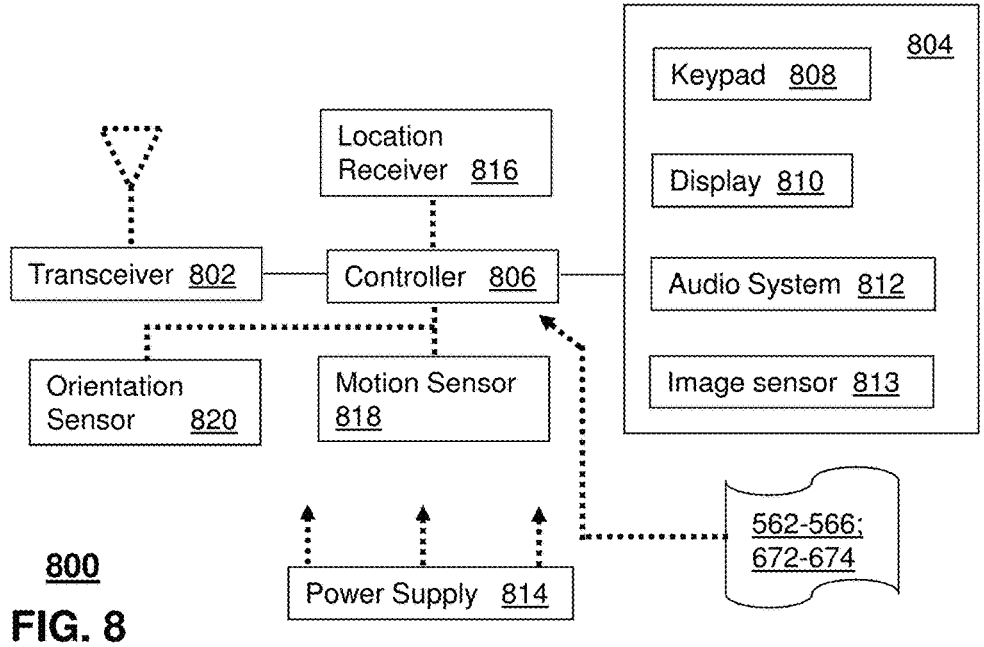
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1-3, and FIGS. 5-6 and can be configured to perform portions of methods 400, 450 of FIGS. 4A-4B.

Communication device 800 can comprise a wireline and/or wireless transceiver 802 (herein transceiver 802), a user interface (UI) 804, a power supply 814, a location receiver 816, a motion sensor 818, an orientation sensor 720, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1-3, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in systems 100, 200, 300 of FIGS. 1-3, communication systems 500-600 of FIGS. 5-6 such as a gaming console and a media player. In addition, the controller 806 can be adapted in various embodiments to perform the functions 562-566 and 672-674, respectively.

Upon reviewing the aforementioned embodiments, it would be evident to an artisan with ordinary skill in the art that said embodiments can be modified, reduced, or enhanced without departing from the scope of the claims described below. For example, entire or partial embodiments can be combined with other entire or partial embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
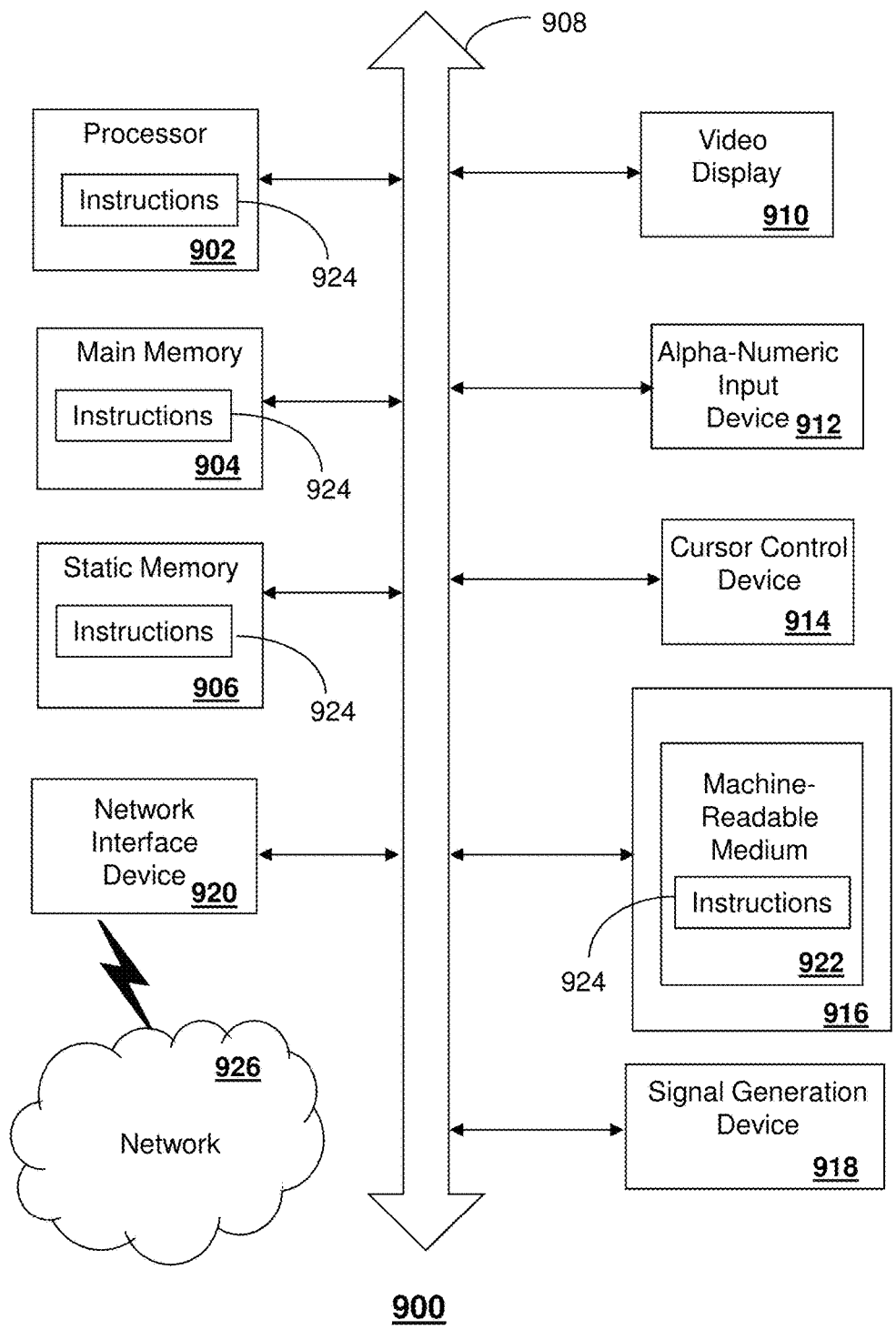
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the video control node 530, the media processor 506, 102, 104, 106, 108, 112, 118, 206, 208, 302, 304, and 308 and other devices of FIGS. 1-8. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
provisioning a target user profile;
obtaining viewing history data;
generating a group of control rules according to the target user profile;
training a machine learning application according to the viewing history data and the group of control rules;
receiving a first indication that a first media content is to be presented at a target user device associated with a target user, wherein the first media content is presented in a primary window on a display of the target user device;
determining by the machine learning application, that the first media content does not conform to the group of control rules;
providing a first notification that the first media content does not conform to the group of control rules;
providing a selectable list of distraction media content to the target user device, wherein the selectable list of distraction media content is presented in a distraction window on the display of the target user device while the first media content is being presented in the primary window; and
providing a selected distraction media content to the target user device in response to receiving a first user-generated input, wherein the first user-generated input comprises a selection of the selected distraction media content, wherein the selectable list of distraction media content comprises the selected distraction media content, wherein the selected distraction media content is presented in the primary window.

2. The device of claim 1, wherein the providing the first notification further comprises providing the first notification to a communication device associated with a monitoring user.

3. The device of claim 1, wherein the operations comprises preventing presentation of the first media content.

4. The device of claim 1, wherein the operations comprises preventing presentation of the first media content in response to receiving a second user-generated input from a communication device associated with a monitoring user.

5. The device of claim 1, wherein the operations comprise transmitting the first media content to a communication device associated with a monitoring user.

6. The device of claim 1, wherein the providing of the distraction media content is in response to determining the first media content to be presented to the target user is passive media content.

7. The device of claim 1, wherein the operations comprise receiving crowd source input, wherein generating the group of control rules comprise generating the group of control rules according to the crowd source input.

8. The device of claim 1, wherein generating the group of control rules comprise generating predictive analytics according to the viewing history data and the target user profile.

9. The device of claim 1, wherein the operations comprise accessing rating information, wherein training the machine learning application comprises training the machine learning application according to the rating information.

10. The device of claim 1, wherein the operations comprise:
receiving a second indication that the first media content was presented to the target user; and
retraining the machine learning application according to the first media content conforming to the group of control rules.

11. The device of claim 1, wherein the operations comprise:
receiving a third indication that a second media content is to be presented to the target user;

determining by the machine learning application, that the second media content does conform to the group of control rules;

providing a second notification that the second media content does conform to the group of control rules;

receiving a fourth indication that the second media content was not presented to the target user; and retraining the machine learning application according to the second media content not conforming to the group of control rules.

12. The device of claim 1, wherein operations comprise receiving a third user-generated input, wherein the third user-generated input comprises a list of exemplary media content, wherein the training the machine learning application comprises training the machine learning application according to the list of exemplary media content.

13. The device of claim 1, wherein operations comprise:
obtaining the first media content; and
analyzing audio content of the first media content using speech recognition resulting in audio content analysis, wherein determining, by the machine learning application, the first media content does not conform to the group of control rules comprise determining, by the machine learning application, the first media content does not conform to the group of control rules according to the audio content analysis.

14. The device of claim 1, wherein operations comprise:
obtaining the first media content; and
analyzing image content of the first media content using image recognition resulting in image content analysis, wherein determining, by the machine learning application, the first media content does not conform to the group of control rules comprise determining, by the machine learning application, the first media content does not conform to the group of control rules according to the image content analysis.

15. The device of claim 5, wherein the first media content is presented on the communication device associated with the monitoring user.

16. A non-transitory machine-readable storage medium, comprising executable instructions that, when executed by a processing system including a processor, facilitate performance of operations, comprising:
generating a target user profile;
receiving viewing history data;
generating control rules according to the target user profile;
training a machine learning application according to the viewing history data and the control rules;
obtaining a first indication that media content is to be presented at a target user device associated with a target user, wherein the first media content is presented in a primary window on a display of the target user device;
determining by the machine learning application, that the media content does not conform to the control rules;
transmitting a first notification that the media content does not conform to the control rules to a communication device associated with a monitoring user;
providing a selectable list of distraction media content to the target user device, wherein the distraction media content is presented in a distraction window on the display of the target user device while the first media content is being presented in the primary window; and providing a selected distraction media content to the target user device in response to receiving a first user-generated input, wherein the first user-generated input comprises a selection of the selected distraction media content, wherein the selectable list of distraction media content comprises the selected distraction media content, wherein the selected distraction media content is presented in the primary window.

17. The non-transitory machine-readable storage medium of claim 16, wherein the operations further comprise transmitting the media content to the communication device associated with the monitoring user, wherein the media content is presented on the communication device associated with the monitoring user.

18. A method, comprising:
updating, by a processing system including a processor, a target user profile;
obtaining, by the processing system, viewing history data;
determining, by the processing system, a group of control rules according to the target user profile;
training, by the processing system, a machine learning application according to the viewing history data and the group of control rules;
receiving, by the processing system, a first indication that a first media content is to be presented at a target user device associated with a target user, wherein the first media content is presented in a primary window on a display of the target user device;
determining, by the processing system, by the machine learning application, that the first media content does not conform to the group of control rules;
providing, by the processing system, a selectable list of distraction media content, wherein the distraction media content conforms to the group of control rules, wherein the distraction media content is presented in a distraction window on the display of the target user device while the first media content is being presented in the primary window; and
providing a selected distraction media content to the target user device in response to receiving a first user-generated input, wherein the first user-generated input comprises a selection of the selected distraction media content, wherein the selectable list of distraction media content comprises the selected distraction media content, wherein the selected distraction media content is presented in the primary window.

19. The method of claim 18, comprising:
receiving, by the processing system, a second indication that a second media content is to be presented to the target user;
determining, by the processing system, by the machine learning application, that the second media content does conform to the group of control rules; and
providing, by the processing system, a second notification that the second media content does conform to the group of control rules.

20. The method of claim 19, comprising:
receiving, by the processing system, a third indication that the second media content was not presented to the target user; and
retraining, by the processing system, the machine learning application according to the second media content not conforming to the group of control rules.

* * * * *